United States Patent [19]

Eklund

[11] Patent Number: 5,137,630
[45] Date of Patent: Aug. 11, 1992

[54] OIL COLLECTING UNIT
[75] Inventor: Curt-Olof Eklund, Porvoo, Finland
[73] Assignee: Oy Larsen Marin AB, Porvoo, Finland
[21] Appl. No.: 768,935
[22] PCT Filed: Apr. 3, 1990
[86] PCT No.: PCT/FI90/00086
§ 371 Date: Nov. 12, 1991
§ 102(e) Date: Nov. 12, 1991
[87] PCT Pub. No.: WO90/12157
PCT Pub. Date: Oct. 18, 1990

[30] Foreign Application Priority Data
Apr. 3, 1989 [FI] Finland .................................. 891580
Oct. 27, 1989 [FI] Finland .................................. 895102

[51] Int. Cl.$^5$ ............................................. E02B 15/04
[52] U.S. Cl. .................................... 210/242.3; 210/540; 210/923
[58] Field of Search ............... 210/242.1, 242.3, 242.4, 210/923, 924, 538, 540

[56] References Cited
U.S. PATENT DOCUMENTS

| | | | |
|---|---|---|---|
| 4,264,450 | 4/1981 | Ayers et al. | 210/242.4 |
| 4,368,122 | 1/1983 | Rowagnan | 210/923 |
| 4,473,469 | 9/1984 | Ayroldi | 210/923 |
| 4,555,338 | 11/1985 | Marchionda | 210/242.4 |
| 4,614,582 | 9/1986 | Campitelli | 210/242.3 |
| 4,642,185 | 2/1987 | Turner et al. | 210/923 |
| 4,673,497 | 6/1987 | Lundin | 210/242.3 |
| 4,957,636 | 9/1990 | Wilson et al. | 210/242.3 |
| 5,043,064 | 8/1991 | Abell et al. | 210/242.3 |
| 5,085,770 | 2/1992 | Eberhardt | 210/242.3 |

FOREIGN PATENT DOCUMENTS

| | | |
|---|---|---|
| 87548 | 9/1983 | European Pat. Off. . |
| 0159019 | 10/1983 | European Pat. Off. . |
| 54-46173 | 4/1979 | Japan . |
| 346346 | 7/1972 | Sweden . |
| 541039 | 10/1973 | Switzerland . |
| 2041231 | 9/1980 | United Kingdom . |
| 2063696 | 6/1981 | United Kingdom . |

Primary Examiner—Stanley S. Silverman
Assistant Examiner—Christopher Upton
Attorney, Agent, or Firm—Ladas & Parry

[57] ABSTRACT

The invention relates to an oil collecting unit for collecting oil from the water surface, comprising rotating oil-collecting brush discs (5), and a comb member (8) separating oil from the brush discs, the brush discs being arranged to press the oil below the water surface and then lift it up through the bottom dead center, so that the water adhering to the brushes drops off. The brush discs (5) comprise brush fibres (19) attached to a rim (18) provided on the outer periphery of the discs. The collecting unit comprises a box (1) divided into adjacent compartments, the first compartment (4) comprising said brush discs (5) positioned over its entire width on a transverse shaft, an opening (17) formed in its front portion for passing oil-containing water against the brush discs (5), and an opening (6) on the inside of the rim (18) of the brush discs (5) for discharging water from the first compartment (4). The comb member (8) comprises a trough (9) for leading the collected oil to the second compartment (3), and a pump (13) is provided in the unit to pump the collected oil out of the second compartment (3) to be removed from the unit.

16 Claims, 3 Drawing Sheets

OIL COLLECTING UNIT

BACKGROUND OF THE INVENTION

The invention relates to an oil collecting unit for collecting oil from the water surface, comprising a rotating oil-collecting brush element, a motor rotating the brush element, and a comb member removing oil from the brush element, the brush element being arranged to press the oil below the water surface and then lift it up through the bottom dead center, so that the water adhering to the brushes drops off, and the oil is removed from the brushes by means of the comb member. In particular, the invention is concerned with an oil collecting apparatus which is suited for temporary or rapid installations and which forms an independent entity.

SE Patent Specification 346346, U.S. Patent Specification 3,617,555, and FI Patent Specification 70443 disclose oil collecting apparatuses provided with cylindrical or broad weblike brush elements. A problem with such collecting apparatuses is that oil-containing water tends to escape from the front of the collecting element to the sides so that the brush fibers of the collecting element do not appropriately catch the oil to be collected. GB Patent Specification 2063696 discloses an oil collecting apparatus provided with several disc plates to the surface of which oil sticks and can be removed therefrom. Despite the great number of plates, the capacity of such apparatuses has proved to be low. FI Patent Specification 71596 discloses an oil collecting apparatus in which a mat provided with brush fibers is placed obliquely around rolls, the mat being formed by several parallel chains to which the brush fibers are attached. Water is able to flow through the chains, which prevents the escape of oil-containing water from the front of the apparatus, which, as mentioned above, is a frequent problem with cylindrical brush elements. This kind of apparatus is of necessity rather large in size.

SUMMARY OF THE INVENTION

The object of the present invention is to provide a compact oil collecting unit which is suited for temporary and rapid installations and by means of which any multi-purpose vessel can be changed into an oil collecting vessel. The characteristic features of the oil collecting unit of the invention are defined in the attached claim 1. Preferably the second compartment, which forms a receiver, is lower, and the first compartment comprises discharge openings on both sides. As compared with prior art oil collecting apparatuses of equal capacity, the present oil collecting unit is small in size. The other advantages and embodiments of the invention will be described in connection with a specific embodiment below.

In the following, the invention will be described by way of example with reference to the attached figures, which show one embodiment of the invention.

DETAILED DESCRIPTION OF THE INVENTION

In a conventional multi-purpose vessel, it is to be preferred to use two oil collecting units. The collecting units are attached to opposite sides of the vessel. In addition to the collecting units, booms 11 are needed the front end of which is attached to the vessel by means of arms and wire-ropes. The other end of the boom is attached to a rail 27 adjacent to an inlet opening 17 formed in the collecting unit. Collected oil is pumped out of the unit through a pipe 15.

Figure 1:
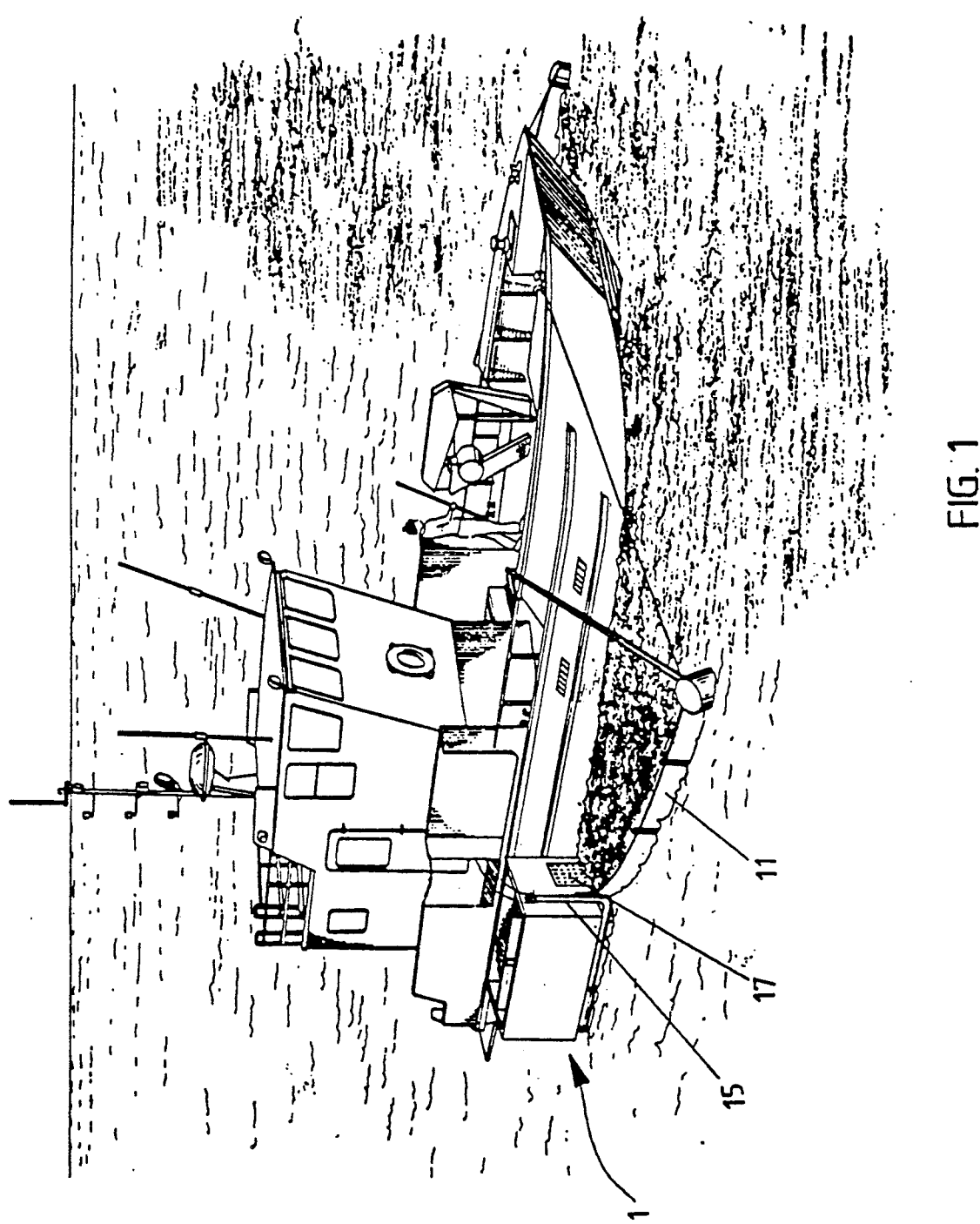
FIG. 1 illustrates the use of the oil collecting unit in connection with a multi-purpose vessel.
Figure 2:
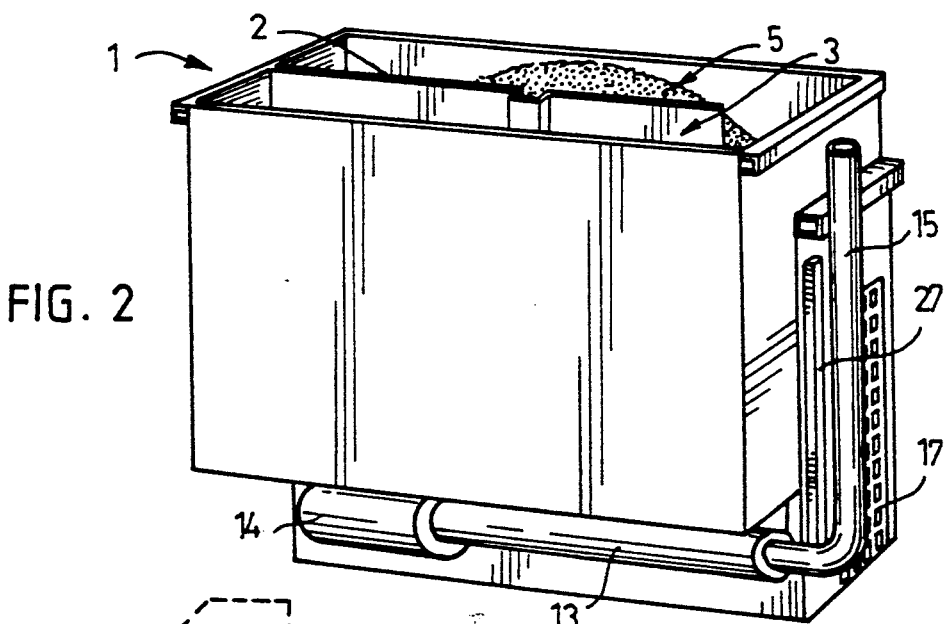
FIG. 2 is an axonometric view of the oil collecting unit.

In FIG. 2, the oil collecting unit is shown when detached. The body of the unit is formed by a box 1 divided into two compartments. The first compartment 4 contains brush discs 5 rotated by a motor 20 while the second compartment 3 acts as a receiver. The compartments 3 and 4 are separated from each other by a partition wall 2. A pump 13 rotated by a hydraulic motor 14 is provided beneath the receiver. By means of the pump, collected oil is pumped through the pipe 15 out of the receiver into the tanks of the vessel. Oil is supplied to the hydraulic motors 14 and 20 from the multi-purpose vessel, to which the hydraulic system is connected by fast coupling means.

With a catamaran, it is preferable to use a three-compartment box in which the middle compartment forms a receiver while the other two contain rotating brush discs.

Figure 3:
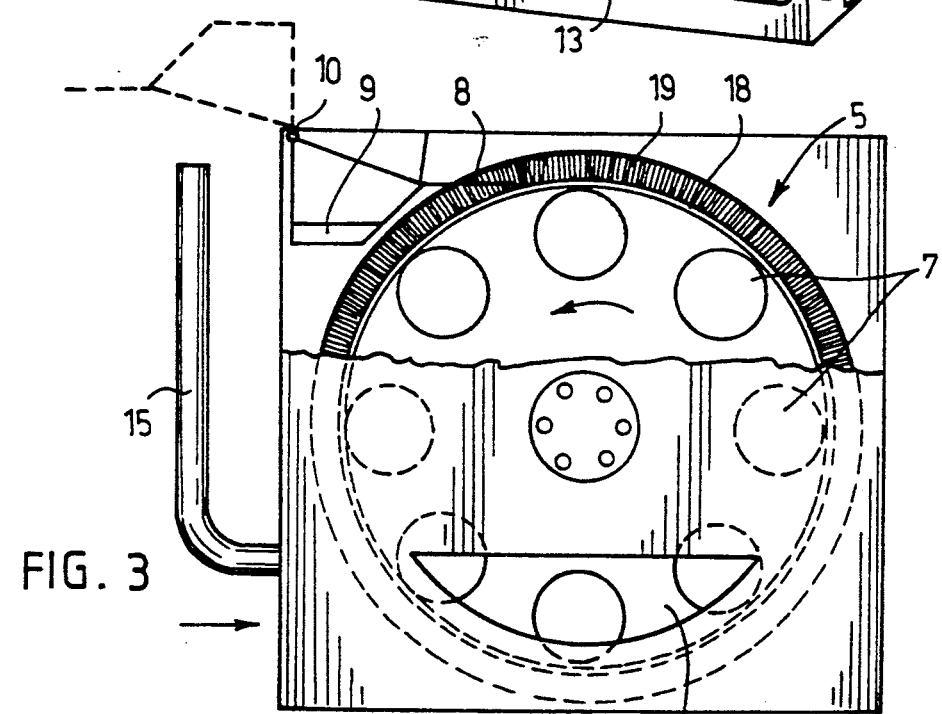
FIG. 3 is a side view of the oil collecting unit.
Figure 4:
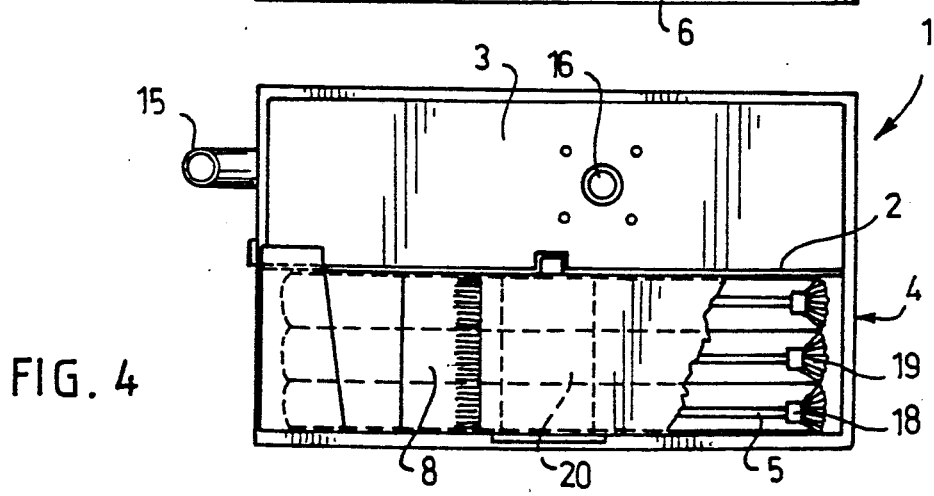
FIG. 4 is a top view of the oil collecting unit.
Figure 5:
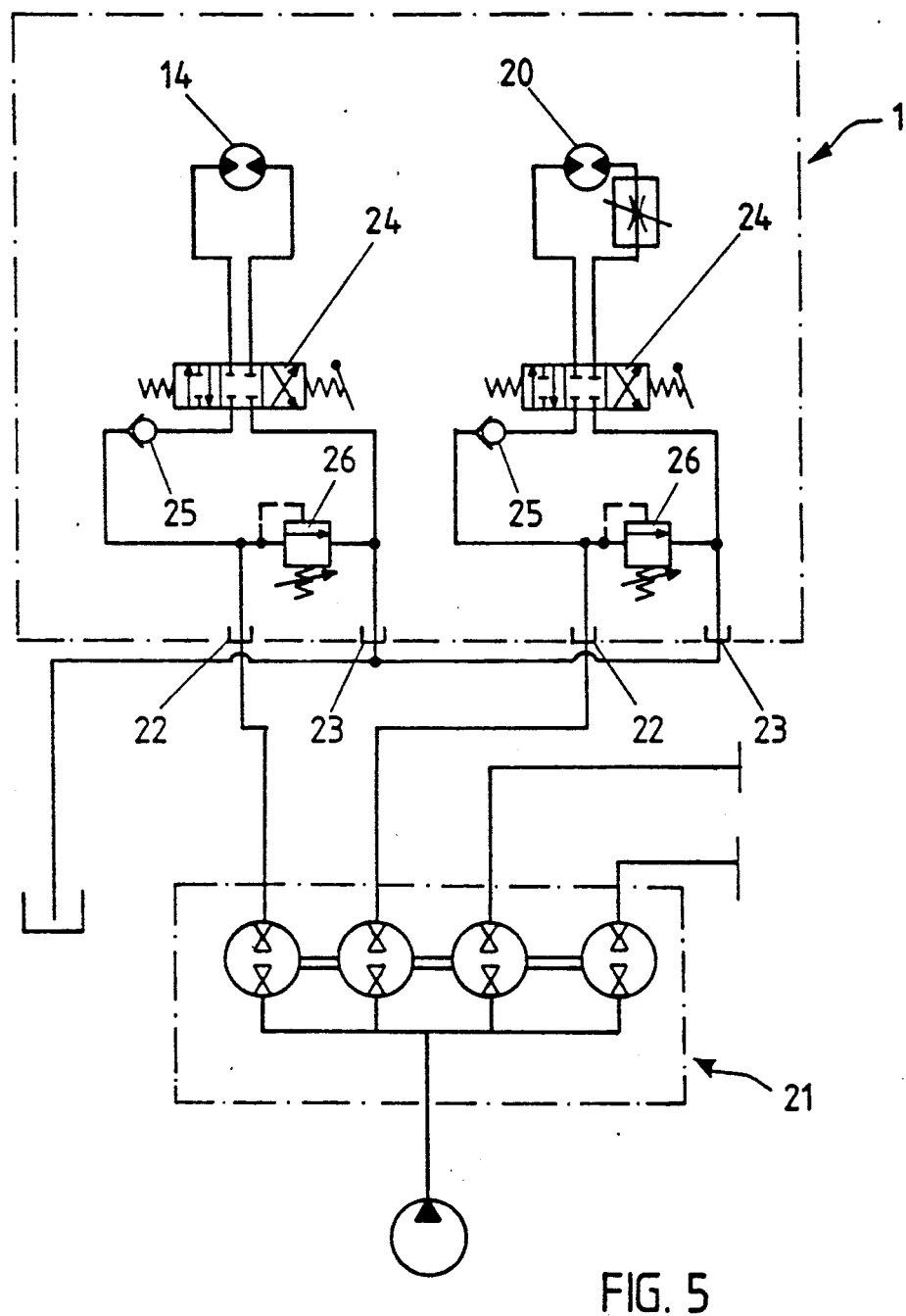
FIG. 5 is a hydraulic diagram of the oil collecting unit.

In FIG. 3, the collecting unit 1 is shown from the side of the brush discs 5 in a partial sectional view. FIGS. 3 and 4 together illustrate in detail the operating principle and structure of the collecting unit. In the figures, oil-containing water enters the first compartment 4 of the box 1 in the collecting unit from the left and is passed against the brush fibers 19 of the brush disc 5. In this example, there are three brush discs provided side by side but the discs can vary in number according to the requirements of each particular case. Essential is that the bristles extend over the entire width of the first compartment 4, so that the oil-containing water has to pass therethrough and the oil sticks to the bristles. Water is able to pass between the disc brushes 5 and through openings 7 provided in the body plates of the discs to the sides and further out of the unit through the side openings 6 of the first compartment 4. The flow of water through the apparatus takes place so efficiently that not counter wave occurs. The bristles are attached to rims 18 provided in the brush discs. The rims are, of course, narrower than the interspace between the discs so that space remains therebetween.

Due to the direction of rotation of the brush discs 5, the fibers 19 press down the oil coming into contact with them so that the oil sticks to the fibers properly. The oil passes through the bottom dead center upward with the bristles and is combed out of the bristles by means of a comb member 8. Between the discs 5 the teeth of the comb member 8 have a greater width than the other teeth. From the comb member 8 the oil runs down into a lower receiving trough which leads through an opening provided in the partition wall 2 into the collecting tank of the second compartment 3. To facilitate maintenance of the brush discs, the comb member 8 and the trough 9 may be turned upward on a hinge 10, whereby the brush discs 5 are visible over their whole length and can be lifted out of the box for cleaning and maintenance.

The pump 13 shown in FIG. 2 communicates with the receiver by means of a bottom connection 16 through which the pump sucks off the oil gathered in the receiver.

Power to the collecting unit is obtained from the vessel, wherefore the supply lines for hydraulic oil are provided with fast coupling means 22 and 23 for connecting the motors 14 and 20 to the same circuit as a pump unit 21. The pump unit 21 may be a stationary part of the vessel or it may be a device operated by a combustion motor. The circuits of the motors 14 and 20 include a valve 24 for controlling them, respectively. Both hydraulic circuits further comprise a one-way valve 25 and a safety valve 26 as protection means.

I claim:

1. An oil collecting unit for collecting oil form the oil surface, comprising a rotating oil-collecting brush element, a motor (20) rotating the brush element, and a comb member (8) removing oil from the brush element into a collecting unit, the brush element being arranged to press the oil below the water surface and then lift it up through the surface, so that the water adhering to the brushes drops off, and the oil is removed from the brushes by means of the comb member (8), wherein the brush element comprises at least two discs (5) each provided with a rim (18) narrower than the interspaces between the discs and provided with oil-collecting fibers (19) projecting outwardly over the width of each of the disc interspaces; the collecting unit comprises a box (1) divided into two adjacent compartments, a first of the compartments (4) containing said brush discs (5) positioned over its width on a transverse shaft, an opening (17) formed in a front portion for passing oil-containing water against the brush discs (5) and at least one side opening (6), positioned inside of the rim (18) of the brush discs (5), for discharging water from the first compartment (4); whereby the comb member (8) comprises a trough (9) for leading the collected oil to the second compartment (3); and the collecting unit comprises a pump (13) for pumping the collected oil out of the second compartment (3) to be removed from the unit.

2. A collecting unit according to claim 1, wherein the first compartment (4) extends substantially deeper than a second of the compartments (3), said side openings (6) being positioned on both sides of the first compartment, whereby the discharge opening (6) on the side of the second compartment is positioned beneath said compartment.

3. An oil collecting unit according to claim 2, wherein the body plates of the brush discs (5) are provided with holes (7) to allow the flow of water between the body plates and out of the opening in the side wall of the box (1).

4. An oil collecting unit according to claim 3, wherein the collecting unit comprises hydraulic motors (14, 20) for the brush discs (5) and the pump (13), respectively; and pipelines for supplying hydraulic fluid to the motors, the pipelines being provided with fast coupling means (22, 23) for connecting the supply of hydraulic fluid from outside the unit, and that the supply lines of each motor comprise a valve (24) for controlling the motors independently of each other.

5. An oil collecting unit according to claim 4, wherein in the interspaces between the discs (5) the teeth of the comb member (8) have a greater width than the other teeth.

6. An oil collecting unit according to claim 3, wherein in the interspaces between the discs (5) the teeth of the comb member (8) have a greater width than the other teeth.

7. An oil collecting unit according to claim 2, wherein the collecting unit comprises hydraulic motors (14, 20) for the brush discs (5) and the pump (13), respectively; and pipelines for supplying hydraulic fluid to the motors, the pipelines being provided with fast coupling means (22, 23) for connecting the supply of hydraulic fluid form outside the unit, and that the supply lines of each motor comprise a valve (24) for controlling the motors independently of each other.

8. An oil collecting unit according to claim 7, wherein in the interspaces between the discs (5) the teeth of the comb member (8) have a greater width than the other teeth.

9. An oil collecting unit according to claim 2, wherein in the interspaces between the discs (5) the teeth of the comb member (8) have a greater width than the other teeth.

10. An oil collecting unit according to claim 1, wherein the body plates of the brush discs (5) are provided with holes (7) to allow the flow of water between the body plates and out of the opening in the side all of the box (1).

11. An oil collecting unit according to claim 10, wherein the collecting unit comprises hydraulic motors (14, 20) for the brush discs (5) and the pump (13), respectively; and pipelines for supplying hydraulic fluid to the motors, the pipelines being provided with fast coupling means (22, 23) for connecting the supply of hydraulic fluid from outside the unit, and that the supply lines of each motor comprise a valve (24) for controlling the motors independently of each other.

12. An oil collecting unit according to claim 11, wherein in the interspaces between the discs (5) the teeth of the comb member (8) have a greater width than the other teeth.

13. An oil collecting unit according to claim 10, wherein in the interspaces between the discs (5) the teeth of the comb member (8) have a greater width than the other teeth.

14. An oil collecting unit according to claim 1, wherein the collecting unit comprises hydraulic motors (14, 20) for the brush discs (5) and the pump (13), respectively; and pipelines for supplying hydraulic fluid to the motors, the pipelines being provided with fast coupling means (22, 23) for connecting the supply of hydraulic fluid from outside the unit, and that the supply lines of each motor comprise a valve (24) for controlling the motors independently of each other.

15. An oil collecting unit according to claim 14, wherein in the interspaces between the discs (5) the teeth of the comb member (8) have a greater width than the other teeth.

16. An oil collecting unit according to claim 1, wherein in the interspaces between the discs (5) the teeth of the comb member (8) have a greater width than the other teeth.

* * * * *